United States Patent
Mori

(10) Patent No.: US 7,036,543 B2
(45) Date of Patent: May 2, 2006

(54) TIRE/WHEEL ASSEMBLY

(75) Inventor: Shinichi Mori, Hiratsuka (JP)

(73) Assignee: The Yokohama Rubber Co.,Ltd., (JP)

( * ) Notice: Subject to any disclaimer, the term of this patent is extended or adjusted under 35 U.S.C. 154(b) by 0 days.

(21) Appl. No.: 10/513,020

(22) PCT Filed: Jul. 23, 2003

(86) PCT No.: PCT/JP03/09322

§ 371 (c)(1),
(2), (4) Date: Nov. 1, 2004

(87) PCT Pub. No.: WO2004/018239

PCT Pub. Date: Mar. 4, 2004

(65) Prior Publication Data

US 2005/0161139 A1      Jul. 28, 2005

(30) Foreign Application Priority Data

Aug. 23, 2002   (JP)   ............................. 2002-243179

(51) Int. Cl.
  *B60C 17/06*   (2006.01)
(52) U.S. Cl. ...................... 152/400; 152/520
(58) Field of Classification Search ................ 152/158, 152/381.5, 381.6, 382, 383, 384, 399, 400, 152/516, 520, 339.1

See application file for complete search history.

(56) References Cited

U.S. PATENT DOCUMENTS 6,463,974 B1 * 10/2002 Hellweg et al. ............. 152/400
6,463,976 B1 * 10/2002 Glinz et al. ................. 152/520

(Continued)

FOREIGN PATENT DOCUMENTS

JP        62-054003 U        4/1987

(Continued)

OTHER PUBLICATIONS

International Search Report for PCT/JP03/09322 mailed on Nov. 4, 2003.

*Primary Examiner*—Russell D. Stormer
(74) *Attorney, Agent, or Firm*—Radner, Fishman & Grauer, PLLC

(57) ABSTRACT

A tire/wheel assembly, wherein a run-flat support body comprising an annular shell having an outer peripheral side as a support surface and an inner peripheral side formed in fork-shaped open legs and elastic rings supporting the end parts of the fork-shaped open legs on a rim is inserted into the hollow part of a pneumatic tire, bent parts are formed at the end parts of the annular shell where the annular shell is connected to the elastic rings, the shape of the elastic ring in a cross section orthogonal to the circumferential direction of the elastic ring is formed into a barrel shape having bulged both side faces, the maximum thickness (A) of the elastic ring in a cross section swelling from a tangential line (L1) extending from the apex (P1) of a hump on the rim so as to abut on the axial inner end (P3) of the bent part is 3 to 6 mm, and the maximum thickness (B) thereof swelling from a tangential line (L2) extending from an intersection (P2) between a line segment (L3) parallel with a tire axis through the centroid of a bead core and the inner surface of the tire bead so as to abut on the axial outer end (P4) of the bent part is 1 to 5 mm.

20 Claims, 2 Drawing Sheets

U.S. PATENT DOCUMENTS

| | | | |
|---|---|---|---|
| 6,843,288 B1 * | 1/2005 | Seko et al. | 152/156 |
| 6,843,289 B1 * | 1/2005 | Shimura et al. | 152/156 |
| 2002/0195183 A1 | 12/2002 | Glinz et al. | |
| 2004/0244897 A1 * | 12/2004 | Hotaka et al. | 152/520 |

FOREIGN PATENT DOCUMENTS

| | | |
|---|---|---|
| JP | 10-297226 A1 | 11/1998 |
| JP | 2001-519279 A1 | 10/2001 |
| WO | WO-99/64260 A1 | 12/1999 |

\* cited by examiner

TIRE/WHEEL ASSEMBLY

TECHNICAL FIELD

The present invention relates to a tire/wheel assembly, and more specifically relates to a tire/wheel assembly with the run-flat durability further enhanced by improving the capability to prevent a tire bead from being demounted.

BACKGROUND ART

Many technologies for allowing emergency driving for hundreds of kilometers even when a pneumatic tire goes flat while a vehicle is running have been proposed based on market demands. Among these many proposals, technologies which were proposed in the Japanese Patent Laid-Open Publications No. 10-297226 and No. 2001-519279 enable run-flat running by attaching a core to a rim within a hollow part of a pneumatic tire mounted on the rim and thus supporting the tire with the core when the tire goes flat.

The aforementioned run-flat core (support body) includes an annular shell and elastic rings. The annular shell has an open-leg structure with the outer peripheral side serving as a support surface and with the inner peripheral side formed into open legs. The elastic rings are attached to the two legs of the run-flat core. Thus, the run-flat core is supported on the rim via the elastic rings. This run-flat core can be used as it is without making any special modifications to existing wheels/rims. Accordingly, the run-flat core has an advantage in that the run-flat core may be acceptable to the market without causing any confusion there.

In the case of the tire/wheel assembly (wheel) having the aforementioned structure, however, a tire bead is sometimes demounted from a rim when the tire goes flat and run-flat running is performed. Thus, further run-flat running may become impossible. For this reason, while it is the most important required characteristic for the run-flat core (support body) to have a function of supporting the weight of the vehicle body during the run-flat running, it is also an important required characteristic to have an excellent function of preventing the tire bead from being demounted in terms of improvement in the run-flat durability.

DISCLOSURE OF THE INVENTION

An object of the present invention is to provide a tire/wheel assembly with the run-flat durability further enhanced by improving the capability to prevent a tire bead from being demounted.

A tire/wheel assembly of the present invention to achieve the aforementioned object is characterized in that, in a tire/wheel assembly having a run-flat support body inserted in a hollow part of a pneumatic tire, the run-flat support body including: an annular shell having an outer peripheral side as a support surface and having an inner peripheral side formed into the form of fork-shaped open legs; and elastic rings supporting the end parts of the fork-shaped open legs on a rim, bent parts are formed at the end parts of the annular shell where the annular shell is connected to the elastic rings; each cross section orthogonal to the circumferential direction of the elastic rings is formed into a barrel shape having bulged both side faces; and, in each cross section of the elastic rings, a maximum thickness A of a part swelling from the tangential line L1 is set to 3 to 6 mm, the tangential line L1 extending from an apex P1 of a hump on the rim so as to abut on the axially inner end P3 of the bent part, and a maximum thickness B of a part swelling from a tangential line L2 is set to 1 to 5 mm, the tangential line L2 extending from the intersection P2 of a line segment L3 parallel to the tire axis through the centroid of the bead core and the inner surface of the tire bead so as to abut on the axially outer end P4 of the bent part.

In such a manner, each cross section of the elastic rings of the run-flat support body is formed into a barrel-shape, and a cross-sectional area interposed between the tangential lines L1 and L2 serves as a load transmitting part. Further, the radially inner end part of each of the elastic rings abuts on the area at least between the hump apex on the rim and the intersection P2 corresponding to the centroid of the bead core in the inner surface of the tire bead. Accordingly, a part of the load is applied as a force component toward the rim flange side through the diagonally inclined inner surface of the tire bead, and the tire bead is strongly held between the elastic ring and the rim flange. In addition, since the force component toward the rim flange side passes the bead core, the force of pressing the tire bead is further increased, thereby further enhancing the effect of preventing the bead from being demounted.

BEST MODES FOR CARRYING OUT THE INVENTION

Figure 1:
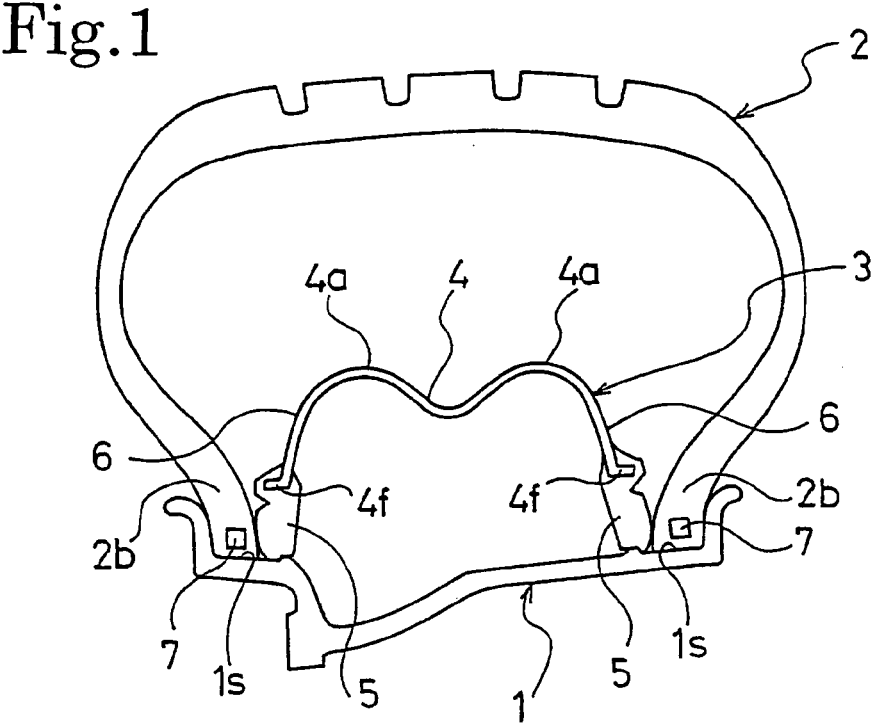
FIG. 1 is a meridian cross-sectional view showing a main portion of a tire/wheel assembly according to an embodiment of the present invention.

In the present invention, a run-flat support body is formed as an annular body to be inserted into a hollow part of a pneumatic tire. The outer diameter of this run-flat support body is made smaller than the inner diameter of the hollow part so as to keep a certain distance between the inner surface of the hollow part of the pneumatic tire and the run-flat support body, and the inner diameter of the hollow part is made substantially equal to the inner diameter of the bead of the pneumatic tire. This run-flat support body is mounted on the wheel together with the pneumatic tire in a state in which the run-flat support body is inserted within the pneumatic tire, and thus the run-flat support body is incorporated into the tire/wheel assembly. When this tire/wheel assembly is mounted on a vehicle and a pneumatic tire gets punctured while running, the punctured and flat tire is supported on the outer peripheral surface of the run-flat support body, thereby allowing run-flat running.

The aforementioned run-flat support body comprises the annular shell and the elastic rings as the main parts.

The annular shell has a continuous support surface for supporting the flat tire formed on the outer peripheral side (outer diameter side) thereof. The inner peripheral side (inner diameter side) thereof is formed into fork-shaped open legs with the both sidewalls as legs. The support surface on the outer peripheral side of the annual shell is formed so that the shape thereof in the cross section orthogonal to the circumferential direction is a curve convex toward the outer diameter side. The number of convex parts on the outer peripheral side of the annular shell may be one or more. When the number of convex parts is any plural number, the load which is supported during the run-flat running can be distributed to the plurality of convex parts, thereby enhancing the durability of the annular shell as a whole.

Because the run-flat support body of the present invention must support the vehicle weight through the flat tire, the annular shell thereof is composed of a rigid material. As such a rigid material, metal, resin, or the like is used. Examples of such a metal among these include steel and aluminum. As such a resin; either thermoplastic resin or thermosetting resin can be used. Examples of such a thermoplastic resin include nylon, polyester, polyethylene, polypropylene, polystyrene, polyphenylene sulfide, and ABS, and examples of such a thermosetting resin include an epoxy resin and an unsaturated polyester resin and the like. The resin may be used alone, but also may be blended with reinforcing fibers to be used as a fiber-reinforced resin.

The elastic rings are attached to the end parts of the fork-shaped both legs on the inner diameter side of the annular shell, respectively, and abut on both rim sheets to support the load from the annular shell. Further, in the present invention, the elastic rings have a special structure to be described later in order to improve the effect of preventing the tire bead from being demounted from the rim. The elastic rings comprises rubber or an elastic resin to absorb shock or vibration which the annular shell receives from the flat tire and, further, to prevent the rim sheets from slipping, thereby stably supporting the annular shell.

In the present invention, the annular shell includes flange-shaped bent parts at portions (end parts) thereof where the annular shell is connected to the elastic rings. With such bent parts, the joint area between the annular shell and the elastic rings is increased, and large coupling strength can be obtained. Moreover, each of the bent parts ensures a certain size of cross-sectional area for transmitting the load, which is interposed between two tangential lines L1 and L2 to be described later, and transmits the load from the annular shell to the rim and the tire bead in a stable state.

On the other hand, the shape of the elastic rings in a cross section orthogonal to the circumferential direction is formed into a barrel shape having bulged both side faces. In this barrel-shaped cross-section having bulged both side faces, one of the bulged parts swells so that a maximum thickness A thereof from the tangential line L1 is 3 to 6 mm, preferably, 4 to 5 mm. Herein, the tangential line L1 extends from an apex P1 of a hump on each of the rim sheets so as to abut on an axially inner end P3 of the bent part at the end part of the annular shell. The other bulged part swells so that a maximum thickness B thereof from the tangential line L2 is 1 to 5 mm, preferably, 1.5 to 3.5 mm. The tangential line L2 extends from an intersection P2 of a line segment L3 and the inner surface of the tire bead so as to abut on an axially outer end P4 of the bent part at the end part of the annular shell, the line segment L3 being parallel to the tire axis through the centroid of the bead core.

As long as the aforementioned bulged parts form a barrel shape, those shapes may be trapezoids or mountains formed of smooth curves. Preferably, at least, the radially center part of each bulged part has the maximum thickness. When the hump has a top portion with a certain width at the same height, the apex P1 of the hump is a center point of the top portion in the width direction.

Since the shape of each elastic ring in a cross section is a barrel shape, as described above, the load applied to each annular shell during the run-flat running is supported at least at the hump apex P1 on the rim through the elastic ring and also supported at the intersection P2 corresponding to the centroid of the bead core in the inner surface of the tire bead.

A force component toward the rim flange side is generated by the diagonally inclined inner surface of the tire bead, and the tire bead can be strongly held between the elastic ring and the rim flange with the force component. Accordingly, it is possible to prevent the tire bead from being demounted from the rim during the run-flat running. When the maximum thicknesses A and B of the bulged parts are less than the respective lower limits of the aforementioned ranges, the effect of preventing the bead from being demounted during the run-flat running is reduced. When the maximum thicknesses A and B thereof are more than the respective upper limits, the weight of the run-flat support body is increased.

The effect of stably supporting the vehicle weight with the aforementioned run-flat support body and the effect of stably generating the force component toward the rim flange side for preventing the bead from being demounted are exerted when an inclination angle $\alpha$ of the tangential line L1 with respect to the direction perpendicular to the tire axis is set between 10 to 20°. More preferably, the inclination angle $\alpha$ is set between 12 to 17°, and these effects can be further improved.

In the present invention, further preferably, a recess part extending in the circumferential direction is provided in a radially outer area in the axially outer side face of each elastic ring having the barrel-shaped cross section. By forming this recess part, it is possible to improve the performance in mounting the run-flat support body on the rim while exerting the aforementioned effects of stably supporting the vehicle weight and of preventing the tire bead from being demounted from the rim.

Since the elastic ring having the barrel-shaped cross-section has large bending rigidity against the axial load, as described above, the performance in mounting the run-flat support body on the rim can be reduced when the elastic ring is used as it is. In the same way that only the pneumatic tire is mounted on the rim, mounting of the run-flat support body onto the rim is performed in a state where the run-flat support body is inserted within the pneumatic tire, by dropping the inner diameter side of the elastic ring in a well of the rim and then raising the elastic ring on the rim sheet while applying the internal pressure. Therefore, when the elastic ring has large bending rigidity, the increase in the bending resistance causes a reduction in the workability in mounting the run-flat support body on the rim.

However, when the recess part extending in the circumferential direction is provided in the axially outer side face of the elastic ring as described above, the elastic ring can be easily bent at the recess part, and thus the mounting-on-the-rim performance can be satisfactory. Even with such a recess part, the functions of the run-flat support body for supporting the load and preventing the bead from being demounted are not damaged owing to the elastic ring having the barrel-shaped cross section as long as the depth and the position of the recess part are proper.

With regard to the maximum depth of the recess part, a distance D from the tangential line L2 is set preferably within 2 mm inward and within 1 mm outward relative to the tangential line L2. In order to reduce the bending resistance, a position with a maximum depth in the recess part is preferably set on the radially inner side of the position where the bent part at the end part of the annular shell is embedded. More specifically, a radial distance H2 from the radially innermost surface of each bent part of the annular shell to the center with the maximum depth of the recess part is set to 10 to 35%, preferably, 20 to 25% of a radial distance H1 from the radially innermost surface of each bent part of the annular shell to the hump apex P1.

Herein, when there is only a position with the maximum depth, the center with the maximum depth means that position, and when the maximum depth extends at the same depth, the center with the maximum depth means the center of the radial length at the same depth.

Moreover, in the bent part at the end of the annular shell, especially within the elastic material in the vicinity of free ends (axially outer ends P4) thereof, stress is concentrated and thus the elastic ring material is likely to be detached therefrom. In order to prevent the elastic ring material from being detached, each of the axially outer ends P4 are preferably surrounded by the elastic ring material with a thickness of at least 5 mm.

Hereinafter, the present invention will be concretely described with reference to the drawings.

FIG. 1 is a cross-sectional view (meridian cross-sectional view) in the tire width direction, showing a main portion of a tire/wheel assembly (wheel) according to an embodiment of the present invention.

Reference numerals 1, 2, and 3 denote a rim on the outer periphery of the wheel, a pneumatic tire, and a run-flat support body, respectively. These rim 1, pneumatic tire 2, and run-flat support body 3 are formed into an annular shape coaxially around a not-shown wheel rotation axis.

The run-flat support body 3 includes an annular shell 4 formed of a rigid material such as a metal or resin, and elastic rings 5 formed of an elastic material such as hard rubber or an elastic resin. The annular shell 4 is so formed as to have two concave parts 4a and 4a, each having a concave surface, arranged side by side in the tire width direction on the outer peripheral side thereof. The both sidewalls of the inner peripheral side of this annular shell 4 are opened in a fork-shape as legs 6 and 6, respectively. The elastic rings 5 and 5 are attached to the end parts of the sidewalls, respectively.

The run-flat support body 3 configured as described above has the elastic rings 5 and 5 attached to beads 2b and 2b and, at the same time, to rim sheets 1s and 1s of the rim 1 in a state where the run-flat support body 3 is inserted inside the pneumatic tire 2. In each of the beads 2b, an annular bead core 7 is embedded along a circumferential direction of the tire. Each of the embedded bead cores 7 gives rigidity to each of the beads 2b.

Figure 2:
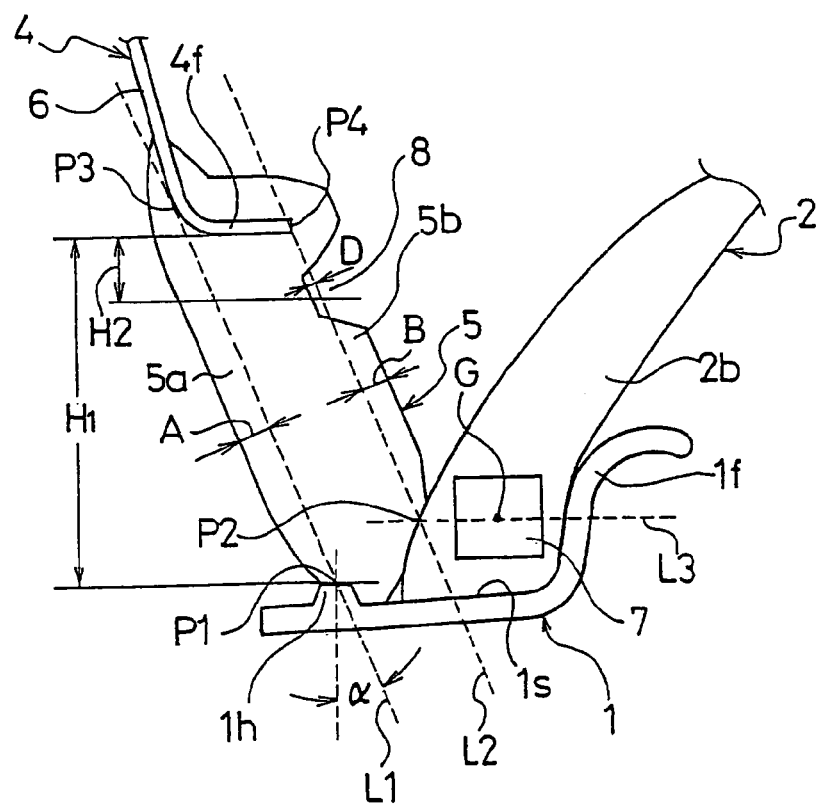
FIG. 2 is a partially-enlarged cross-sectional view showing a tire bead of the tire/wheel assembly of FIG. 1.

As shown in FIG. 2, in the both end parts of the aforementioned annular shell 4, flange-shaped bent parts 4f and 4f are formed, respectively. The bent parts 4f and 4f are integrally joined with the annular elastic rings 5 so as to be embedded on the outer peripheral side of the annular elastic rings. The shape of the elastic ring 5 in a cross section (meridian cross-sectional view) orthogonal to the circumferential direction is formed into a barrel shape as a whole and includes bulged parts 5a and 5b on both sides.

The bulged part 5a on one side swells from a tangential line L1 so that a maximum thickness A is 3 to 6 mm, and preferably, 4 to 5 mm. The tangential line L1 extends from an apex P1 (center point of the flat width direction) of a hump 1h on the rim sheet 1s so as to abut on the axially inner end P3 of the bent part 4f of the annular shell 4. The bulged part 5b on the other side swells from a tangential line L2 so that a maximum thickness B is 1 to 5 mm, preferably, 1.5 to 3.5 mm. The tangential line L2 extends from an intersection P2 of a line segment L3 and the inner surface of the tire bead 2b so as to abut on the axially outer end P4 of the bent part 4f of the annular shell 4, the line segment L3 being parallel to the tire axis through the centroid G of the bead core 7. Each shape of these bulged parts 5a and 5b may be a trapezoid or a mountain formed of smooth curves as long as the bulged parts 5a and 5b form a barrel shape as a whole.

The radially inner end of the elastic ring 5 with the barrel-shaped cross section as described above abuts, at least, on the apex P1 of the hump 1h on the rim sheet is and on the intersection P2 on the inner surface of the tire bead. Accordingly, the load from the annular shell 4 is supported on the rim sheet 1s, and a part of the load is supported with the tire bead 2b to generate a force component to a rim flange 1f, thereby strongly holding the tire bead 2b between the elastic ring 5 and the rim flange 1f. Since the force component toward the rim flange side passes the centroid G of the bead core 7, the action of fixing the tire bead 2 is further enhanced and thus the excellent effect of preventing the tire bead from being demounted is exerted. This effect of preventing the tire bead from being demounted is further improved by setting an inclination angle α between 10 to 20°, preferably between 12 to 17°, the inclination angle α being an angle of the tangential line L1 with respect to the direction perpendicular to the tire axis.

The elastic ring 5 shown in the drawing is provided with a recess part 8 extending in the circumferential direction in a radially outer area on the axially outer side face. The formation of the recess part 8 allows the elastic ring 5 to be easily bent with the recess part 8 as a bending portion, thus making the performance in mounting the run-flat support body 3 on the rim satisfactory.

Figure 3:
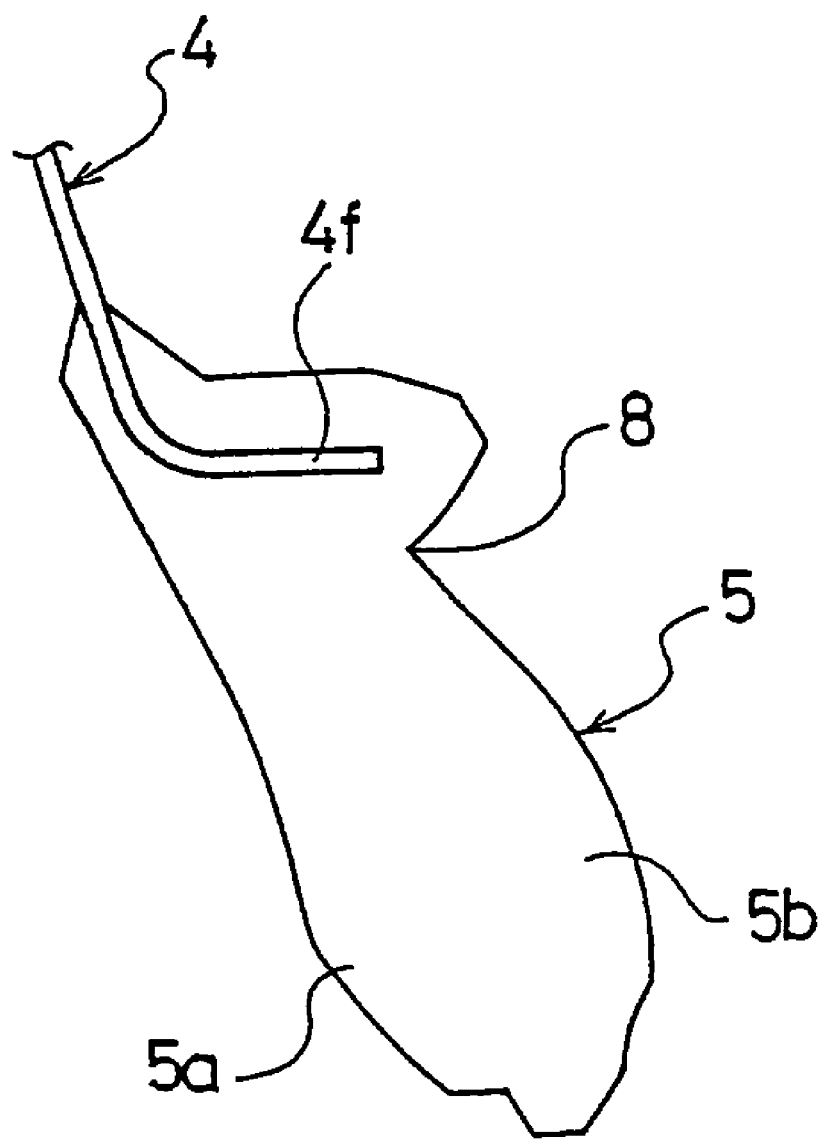
FIG. 3 is a partially-enlarged cross-sectional view showing an elastic ring according to another embodiment of the present invention.

The maximum depth of the recess part 8 is set within 2 mm inward and within 1 mm outward as a distance D from the tangential line L2. The position with the maximum depth in the recess part 8 is set as a radial distance H2 from the radially innermost surface of the bent part 4f of the annular shell 4 so as to be at 10 to 35%, preferably, 20 to 25% of a radial distance H1 between the radially innermost surface of the bent part 4f of the annular shell 4 and the hump apex P1. Herein, when the maximum depth extends at the same depth as shown in FIG. 2, the center of the radial length is employed as the position with the maximum depth of the recess part, and when there is only one position with the maximum depth as illustrated in FIG. 3, that one position is employed.

The periphery of the axially outer end P4 of the bent part 4f of the annular shell 4 is covered with a rubber material of the elastic ring 5 with a thickness of at least 5 mm. Thus, by covering the axially outer end P4 with the elastic ring 5, as described above, the detachment failures due to the stress concentrated on the axially outer end P4 of the bent part 4f is reduced.

EMBODIMENTS

Tire/wheel assemblies (wheels) according to embodiments 1 to 10 and comparative examples 1 to 5, in which the maximum thicknesses A and B of the bulged parts in the barrel shape are varied as shown in Table 1, were produced under the following common conditions: the tire size and the rim size are 205/55R16 and 16×6 ½JJ, respectively; the annular shell of the run-flat support body is molded from a steel sheet with a thickness of 1 mm; the elastic rings are so formed of rubber with a JIS-A hardness of 85 as to have a barrel-shaped cross section shown in FIG. 2; the inclination angle α of the tangential line L1 was 10°; the depth D of the recess part was 0 mm; and the H2 was 20% of H1.

The aforementioned 15 types of the tire/wheel assemblies were measured in accordance with the following measurement method in terms of the run-flat durability and whether or not the bead was demounted from the rim, and the results thereof are shown in Table 1.

The results shown in Table 1 reveal that any of the tire/wheel assemblies of the present invention did not have the bead thereof demounted, but exerted good run-flat durability. On the other hand, any of the comparative examples 1 to 3 each having the elastic rings with no bulged part formed at least on one side resulted in low run-flat durability. The comparative examples 4 and 5 had satisfactory run-flat durability but are not preferable because of too much weight thereof.

[Run-Flat Durability]

A 2500cc car with the test tire/wheel assembly (inflation pressure: 0 kPa) attached to the front left wheel and with the other tires inflated at 200 kPa was driven in a circuit by a test driver at a speed of 90 km/h. Then, the distance traveled until the tire bead was demounted from the rim and thus the running became impossible was measured. When the tire bead was not demounted, the distance traveled until the tire or the run-flat support body got damaged was measured.

The evaluation results are indicated by indices with the measured travel distance of the tire/wheel assembly of the comparative example 1 defined as 100. Larger indices mean more excellent run-flat durability.

TABLE 1

| | Maximum Thickness A | Maximum Thickness B | Run-Flat Durability (index) | Bead demounting |
|---|---|---|---|---|
| Comparative Example 1 | 0 | 0 | 100 | Demounted |
| Comparative Example 2 | 5 | 0 | 95 | Not demounted |
| Comparative Example 3 | 0 | 3 | 100 | Demounted |
| Embodiment 1 | 2 | 3 | 101 | Not demounted |
| Embodiment 2 | 3 | 3 | 103 | Not demounted |
| Embodiment 3 | 4 | 3 | 105 | Not demounted |
| Embodiment 4 | 5 | 3 | 111 | Not demounted |
| Embodiment 5 | 6 | 3 | 113 | Not demounted |
| Comparative Example 4 | 8 | 3 | 115 | Not demounted |
| Embodiment 6 | 4 | 1 | 102 | Not demounted |
| Embodiment 7 | 4 | 1.5 | 103 | Not demounted |
| Embodiment 8 | 4 | 3.5 | 106 | Not demounted |
| Embodiment 9 | 4 | 4 | 107 | Not demounted |
| Embodiment 10 | 4 | 5 | 109 | Not demounted |
| Comparative Example 5 | 4 | 8 | 113 | Not demounted |

As described above, according to the present invention, the elastic rings of the run-flat support body are formed as to have the barrel-shaped cross section, and the cross-sectional area interposed between the tangential lines L1 and L2 serves as the load transmitting part. The radially inner end part of each of the elastic rings abuts on the area at least between the hump apex on the rim and the intersection P2 corresponding to the centroid of the bead core on the inner surface of the tire bead. Accordingly, a part of the load is applied as the force component toward the rim flange side through the diagonally inclined inner surface of the tire bead, and the tire bead can be strongly held between the elastic ring and the rim flange. In addition, since the force component toward the rim flange side passes the centroid of the bead core, the force of pressing the tire bead against the rim flange is further increased, thereby further enhancing the effect of preventing the bead from being demounted.

What is claimed is:

1. A tire/wheel assembly having a run-flat support body inserted into a hollow part of a pneumatic tire, the run-flat support body including:
    an annular shell having an outer peripheral side thereof as a support surface and having an inner peripheral side thereof formed into fork-shaped open legs; and
    elastic rings supporting the end parts of the fork-shaped open legs on a rim,
    wherein bent parts are formed at the end parts of the annular shell where the annular shell is connected to the elastic rings, and the shape of the elastic rings in a cross section orthogonal to a circumferential direction is formed to have a barrel shape having bulges on both side faces, and
    wherein, in the cross section of each of the elastic rings, a maximum thickness of a part swelling from a first tangential line (L1) is set to 3 to 6 mm, and a maximum thickness (B) of a part swelling from a second tangential line (L2) in a main body of each of the elastic rings positioned radially inside of the bent parts is set to 1 to 5 mm, the first tangential line (L1) extending from an apex (P1) of a hump of the rim so as to abut on the axially inner end (P3) of the bent part, the second tangential line (L2) extending from the intersection (P2) of the inner surface of the tire bead and a line segment (L3) parallel to the tire axis through the centroid of the bead core so as to abut on the axially outer end (P4) of the bent part.
2. The tire/wheel assembly according to claim 1, wherein the elastic rings inclines axially inward.
3. The tire/wheel assembly according to claim 1, wherein an inclination angle α of the first tangential line (L1) with respect to the direction perpendicular to the tire axis is set to 10 to 20°.
4. The tire/wheel assembly according to claim 1, wherein a recess part extending in the circumferential direction is provided in a radially outer portion on the axially outer side of each of the elastic rings.
5. The tire/wheel assembly according to claim 4, wherein a maximum depth of the recess part is set within 2 mm inward and within 1 mm outward with respect to the line segment (L2).
6. The tire/wheel assembly according to claim 4, wherein a radial distance (H2) from a radially innermost surface of the bent part of the annular shell to the center of the maximum depth of the recess part is set to 10 to 35% of a radial distance (H1) from the radially innermost surface of the bent part of the annular shell to the center point (P1) of the hump.
7. The tire/wheel assembly according to claim 1, wherein the thickness of a part of the elastic rings surrounding the axially outer end P4 of the bent part is not less than 5 mm.
8. The tire/wheel assembly according to claim 2, wherein an inclination angle α of the tangential line (L1) with respect to the direction perpendicular to the tire axis is set to 10 to 20°.
9. The tire/wheel assembly according to claim 8, wherein a recess part extending in the circumferential direction is provided in a radially outer portion on the axially outer side of each of the elastic rings.
10. The tire/wheel assembly according to claim 9, wherein a maximum depth of the recess part is set within 2 mm inward and within 1 mm outward with respect to the line segment (L2).

11. The tire/wheel assembly according to claim 9,
wherein a radial distance (H2) from a radially innermost surface of the bent part of the annular shell to the center of the maximum depth of the recess part is set to 10 to 35% of a radial distance (H1) from the radially innermost surface of the bent part of the annular shell to the center point (P1) of the hump.

12. The tire/wheel assembly according to claim 8,
wherein the thickness of a part of the elastic ring surrounding the axially outer end (P4) of the bent part is not less than 5 mm.

13. The tire/wheel assembly according to claim 3, wherein a recess part extending in the circumferential direction is provided in a radially outer portion on the axially outer side of each of the elastic rings.

14. The tire/wheel assembly according to claim 13,
wherein a maximum depth of the recess part is set within 2 mm inward and within 1 mm outward with respect to the line segment (L2).

15. The tire/wheel assembly according to claim 13,
wherein a radial distance (H2) from a radially innermost surface of the bent part of the annular shell to the center of the maximum depth of the recess part is set to 10 to 35% of a radial distance (H1) from the radially innermost surface of the bent part of the annular shell to the center point (P1) of the hump.

16. The tire/wheel assembly according to claim 3,
wherein the thickness of a part of the elastic ring surrounding the axially outer end (P4) of the bent part is not less than 5 mm.

17. The tire/wheel assembly according to claim 2,
wherein a recess part extending in the circumferential direction is provided in a radially outer portion on the axially outer side of each of the elastic rings.

18. The tire/wheel assembly according to claim 17,
wherein a maximum depth of the recess part is set within 2 mm inward and within 1 mm outward with respect to the line segment (L2).

19. The tire/wheel assembly according to claim 17,
wherein a radial distance (H2) from a radially innermost surface of the bent part of the annular shell to the center of the maximum depth of the recess part is set to 10 to 35% of a radial distance (H1) from the radially innermost surface of the bent part of the annular shell to the center point (P1) of the hump.

20. The tire/wheel assembly according to claim 2,
wherein the thickness of a part of the elastic ring surrounding the axially outer end (P4) of the bent part is not less than 5 mm.

* * * * *